US012266198B2

(12) United States Patent
Jeong et al.

(10) Patent No.: US 12,266,198 B2
(45) Date of Patent: Apr. 1, 2025

(54) APPARATUS AND METHOD FOR RECOMMENDING LEARNING USING OPTICAL CHARACTER RECOGNITION

(71) Applicant: WOONGJIN THINKBIG CO., LTD., Paju-si (KR)

(72) Inventors: Jinhwan Jeong, Paju-si (KR); Nanju Kim, Paju-si (KR); Dohyung Kim, Paju-si (KR); Seori Park, Paju-si (KR); Nuri Lim, Paju-si (KR); Haejin Kim, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 351 days.

(21) Appl. No.: 17/951,079

(22) Filed: Sep. 22, 2022

(65) Prior Publication Data
US 2023/0112614 A1  Apr. 13, 2023

(30) Foreign Application Priority Data
Sep. 23, 2021 (KR) ......... 10-2021-0125646

(51) Int. Cl.
*G06V 30/148* (2022.01)
*G06F 16/355* (2025.01)
*G06F 16/36* (2019.01)
*G06V 30/146* (2022.01)

(52) U.S. Cl.
CPC ......... *G06V 30/153* (2022.01); *G06F 16/355* (2019.01); *G06F 16/367* (2019.01); *G06V 30/1478* (2022.01)

(58) Field of Classification Search
None
See application file for complete search history.

(56) References Cited

U.S. PATENT DOCUMENTS

2022/0036491 A1  2/2022  Ahn

FOREIGN PATENT DOCUMENTS

| EP | 1 239 406 A2 | 9/2002 |
|---|---|---|
| KR | 10-1041672 B1 | 6/2011 |
| KR | 20190142288 A * | 2/2019 |

(Continued)

OTHER PUBLICATIONS

KR Office Action dated Sep. 23, 2021 as received in Application No. 10-2021-0125646.

(Continued)

*Primary Examiner* — Delomia L Gilliard
(74) *Attorney, Agent, or Firm* — Maschoff Brennan

(57) ABSTRACT

There are provided a learning recommendation apparatus and method for detecting a problem from an image through character recognition and providing at least one sub-topic learning among a plurality of sub-topic learnings related to the detected problem. The provided learning recommendation apparatus recommends, as a recommendation target, a plurality of learning topics including the concept of a formula which has been read through the character recognition for an image, wherein a priority order is set to the plurality of learning topics based on the concept distance between the learning topic and the learning history, and the learning topics are recommended so that the learning topic having a higher priority order is located at a higher position.

13 Claims, 15 Drawing Sheets

(56) References Cited

FOREIGN PATENT DOCUMENTS

| KR | 10-2019-0142288 A | 12/2019 |
|----|-------------------|---------|
| KR | 10-2056822 B1     | 12/2019 |
| KR | 102284393 B1      | 8/2021  |
| KR | 10-2303517 B1     | 9/2021  |
| WO | 2013/110285 A1    | 8/2013  |

OTHER PUBLICATIONS

Eto Y et al: Mathematical formula recognition using virtual link network, Document Analysis and Recognition, 2001. Proceedings. Sixth International Conference on Seattle, WA, Sep. 10, 2001, pp. 762-767, XP010560608.

Hunsinger J et al.: A single-stage top-down probabilistic approach towards understanding spoken and handwritten mathematical formulas, Proceedings of the International Conference of Spoken Languageprocessing, vol. 4, Oct. 16, 2000, pp. 386-389, XP002314337.

Twaakyondo H M et al: Structure analysis and recognition of mathematical expressions, Document Analysis and Recognition, Proceedings of the Third International Conference on Montreal, Que, Canada, vol. 1, Aug. 14, 1995, pp. 430-437, XP010230970.

European Search Report issued in corresponding application No. 22197527.9, dated Dec. 6, 2022.

* cited by examiner

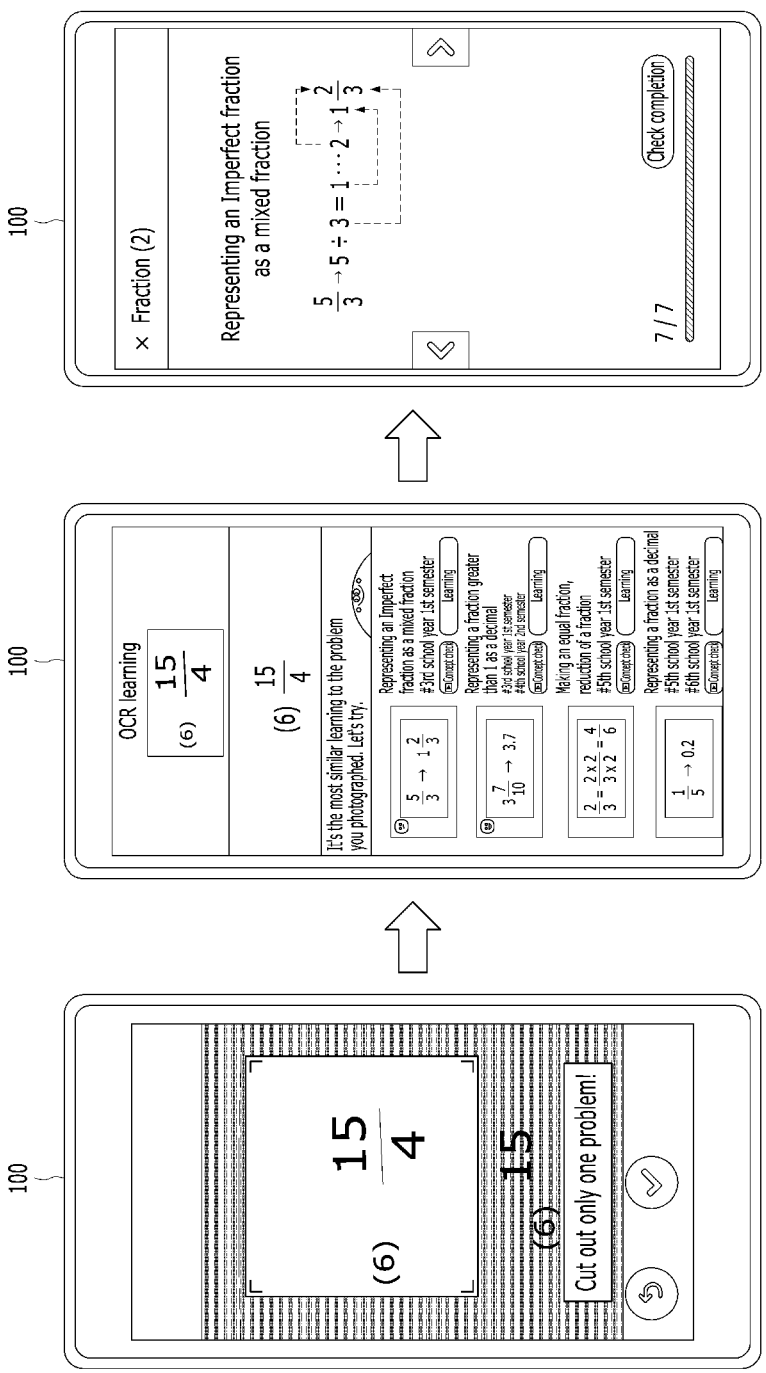

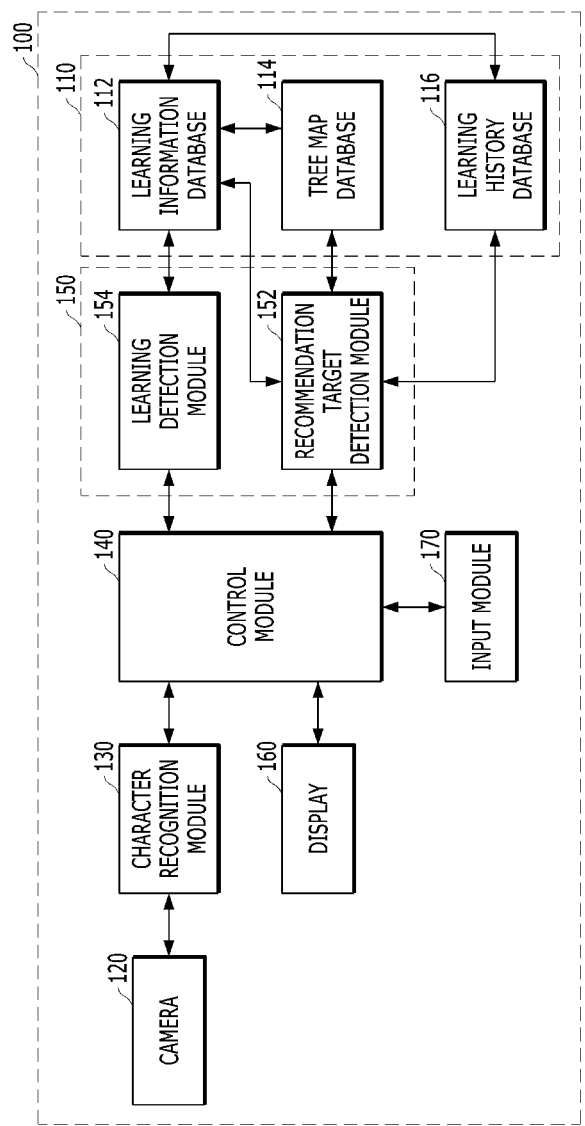
[FIG. 2]

[FIG. 3]
| LEARNING CODE | LEARNING TOPIC | CONCEPT | PROBLEM LEARNING |
|---|---|---|---|
| M0101 | Math 11 | Link 11 | Link 11-1, Link 11-2, Link 11-n |
| M0102 | Math 12 | Link 12 | Link 12-1, Link 12-2, Link 12-m |
| M0201 | Math 21 | Link 21 | Link 21-1, Link 21-2, Link 21-k |
| M0202 | Math 22 | Link 22 | Link 22-1, Link 22-2, Link 22-I |
| M0203 | Math 23 | Link 23 | Link 23-1, Link 23-2, Link 23-j |
| ... | ... | ... | ... |
[FIG. 4]
| LEARNING CODE | LEARNING TOPIC |
|---|---|
| M0101 | NUMBER 1-5 |
| M0102 | NUMBER 6-9 |
| M0103 | ORDER OF NUMBERS UP TO 9 |
| M0104 | COLLECTION 2-5 |
| M0105 | COLLECTION 6-9 |
| M0106 | DIVISION 2-5 |
| M0107 | DIVISION 6-9 |
[FIG. 5]
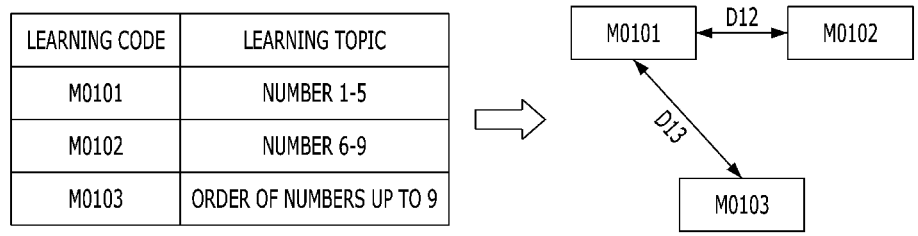

[FIG. 6]

| LEARNING CODE | LEARNER NAME | SCHOOL YEAR | LEARNING COMPLETION | LEARNING |
|---|---|---|---|---|
| U0001 | USER 1 | ELEMENTARY 1 | M0101 | M0102 |
| U0002 | USER 2 | ELEMENTARY 1 | M0101, M0102 | M0201 |
| U0003 | USER 3 | ELEMENTARY 1 | M0201, M0202 | M0203 |
| ... | ... | ... | ... | ... |

[FIG. 7]

| LEARNING NAME | LEARNING CODE | LEARNING TOPIC | |
|---|---|---|---|
| LEARNING ABOUT FRACTIONS | G02_0_1 | FRACTION(1) | |
| | G02_0_2 | FRACTION(2) | ← RECOMMENDATION TARGET 1 |
| | G03_0_1 | FRACTION(3) | |
| | G03_0_2 | FRACTION(4) | |
| ADDITION OF FRACTIONS WITH THE SAME DENOMINATOR | G05_0_1 | ADDITION OF FRACTIONS (1) | ← LEARNER A'S RECENT LEARNING HISTORY |
| | G05_0_2 | ADDITION OF FRACTIONS (2) | |
| | G06_0_1 | ADDITION OF FRACTIONS (3) | |
| | G06_0_2 | ADDITION OF FRACTIONS (4) | |
| SUBTRACTION OF FRACTIONS WITH THE SAME DENOMINATOR | G07_0_1 | SUBTRACTION OF FRACTIONS (1) | |
| | G07_0_2 | SUBTRACTION OF FRACTIONS (2) | |
| | G08_0_1 | SUBTRACTION OF FRACTIONS (3) | |
| | G08_0_2 | SUBTRACTION OF FRACTIONS (4) | |
| REDUCTION, AND REDUCTION TO A COMMON DENOMINATOR | G17_0_1 | REDUCTION (1) | |
| | G17_0_2 | REDUCTION (3) | |
| | G18_0_1 | REDUCTION (3) | ← LEARNER B'S RECENT LEARNING HISTORY |
| | G18_0_2 | REDUCTION (4) | |
| | G19_0_1 | REDUCTION (5) | |
| | G22_0_1 | REDUCTION TO A COMMON DENOMINATOR (1) | |
| | G22_0_2 | REDUCTION TO A COMMON DENOMINATOR (2) | ← RECOMMENDATION TARGET 2 |
| | G23_0_1 | REDUCTION TO A COMMON DENOMINATOR (3) | |
| | G23_0_2 | REDUCTION TO A COMMON DENOMINATOR (4) | |
| | G25_0_2 | REDUCTION TO A COMMON DENOMINATOR (5) | |

[FIG. 8]
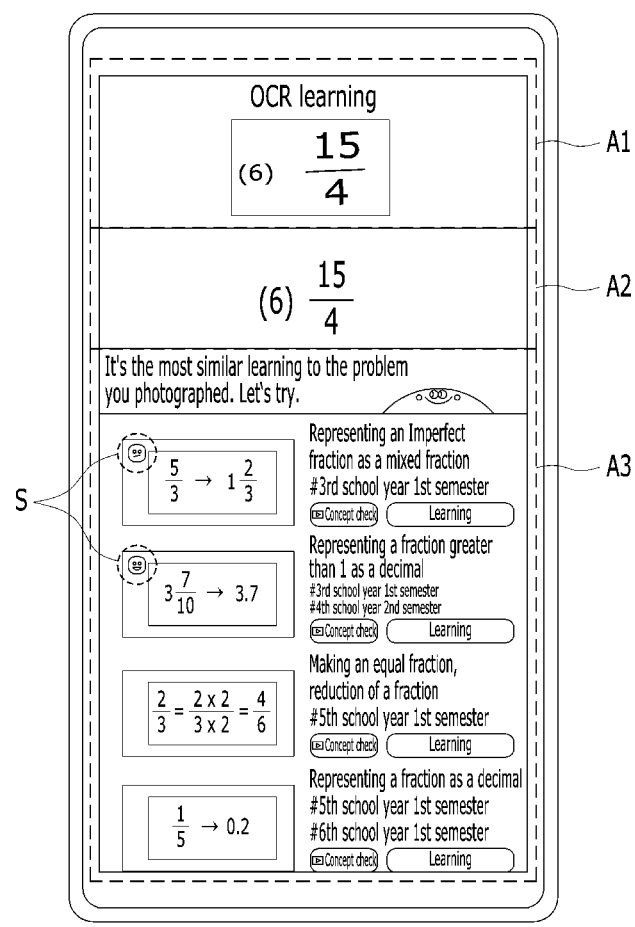

[FIG. 9]
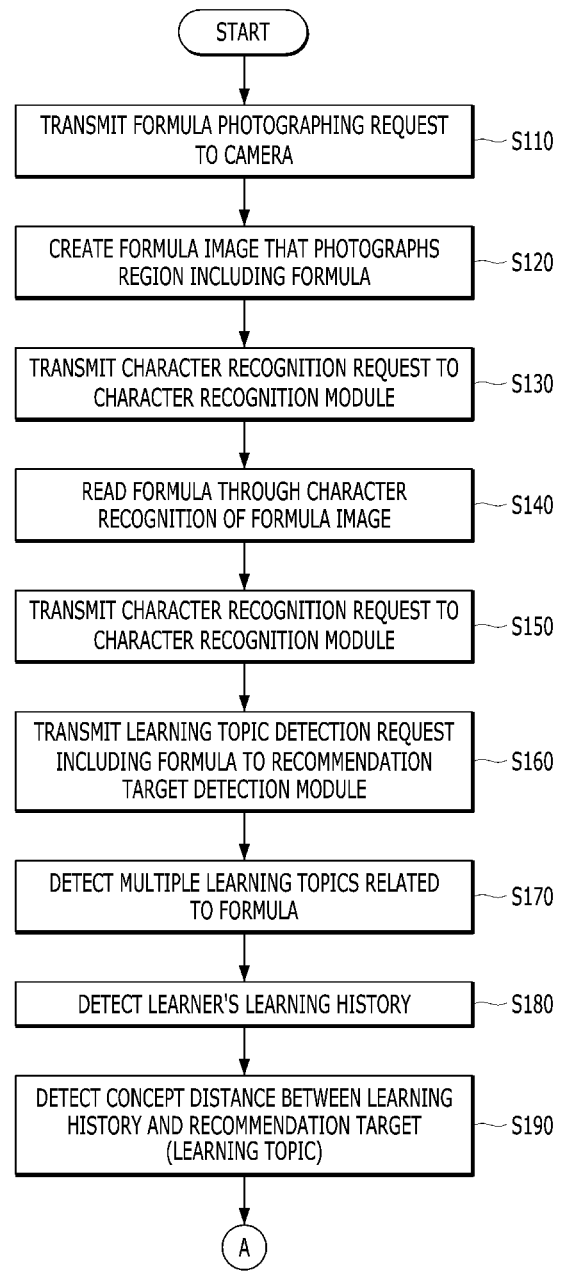

[FIG. 10]
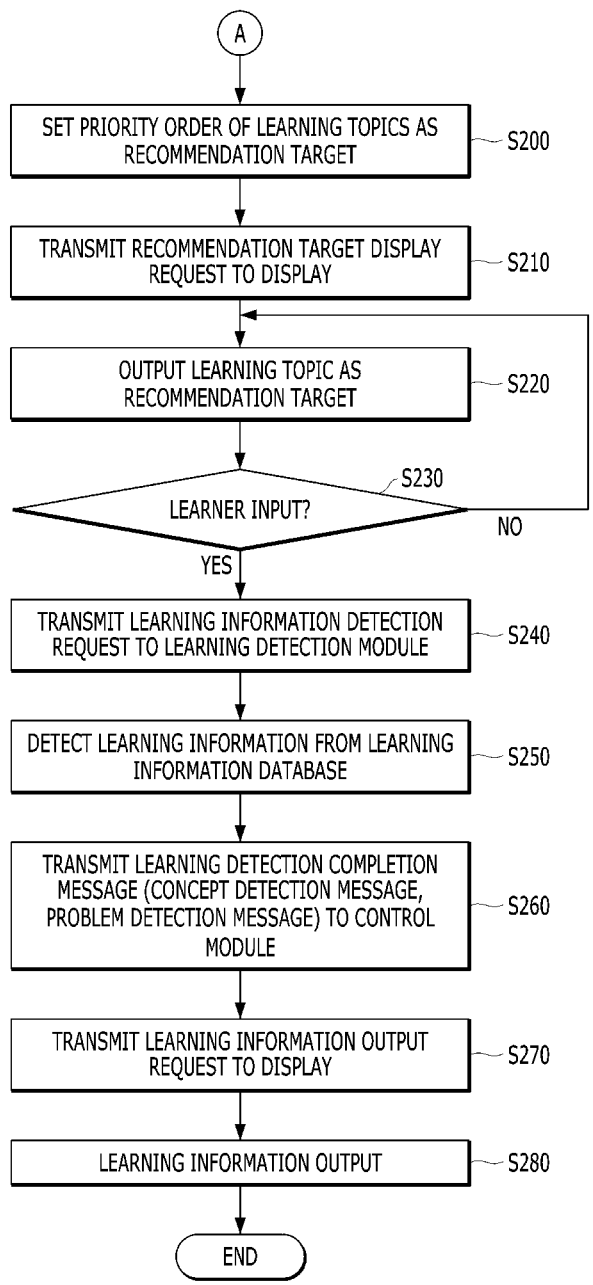

[FIG. 11]
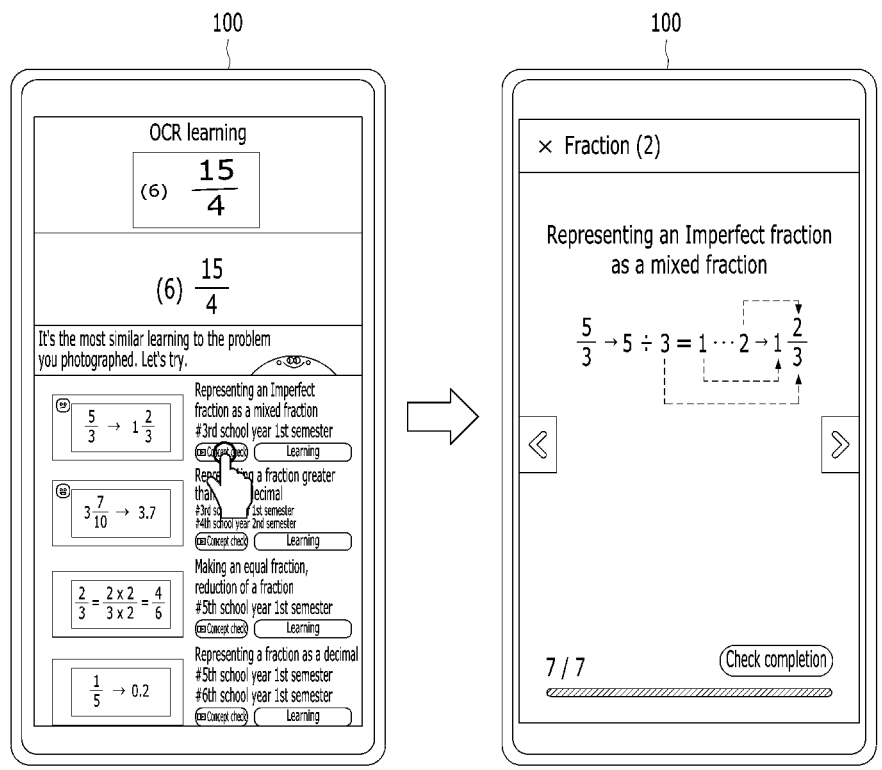

[FIG. 12]

[FIG. 13]
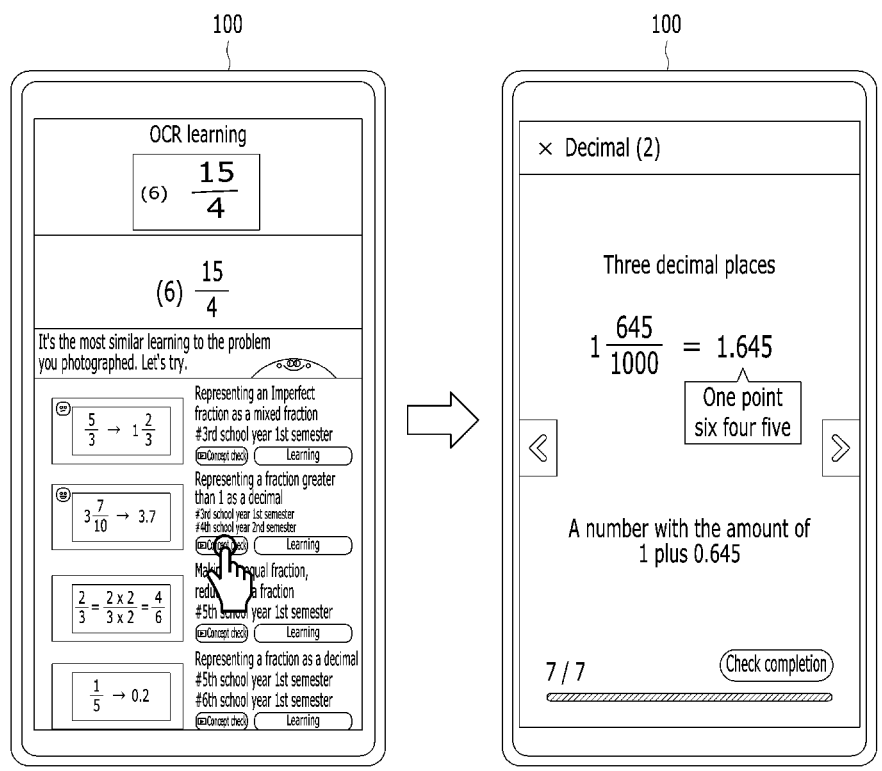

[FIG. 14]

[FIG. 15]
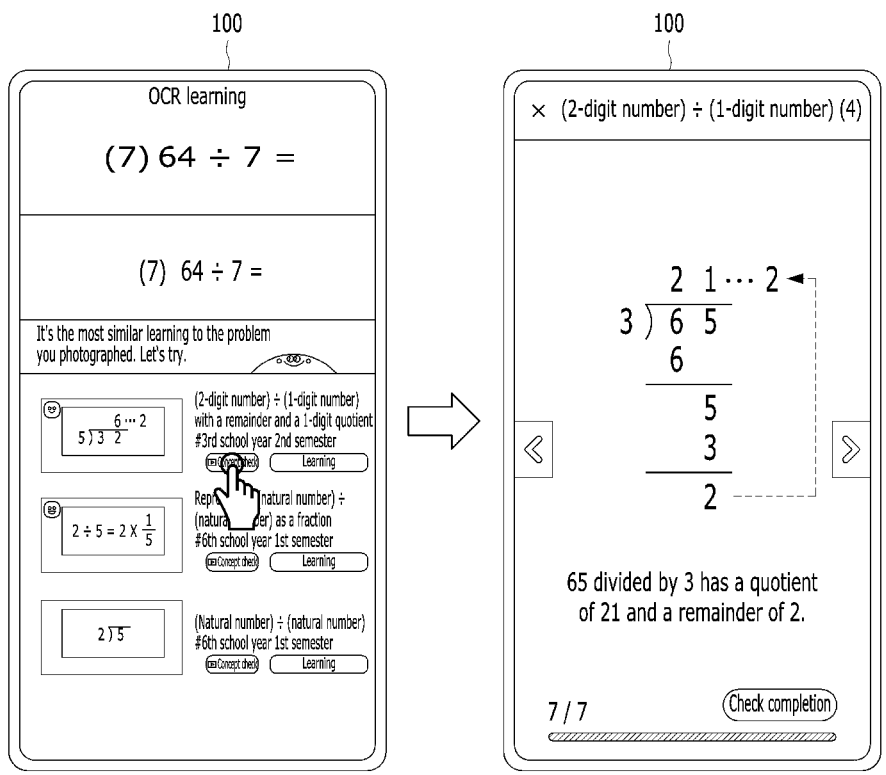

[FIG. 16]

[FIG. 17]
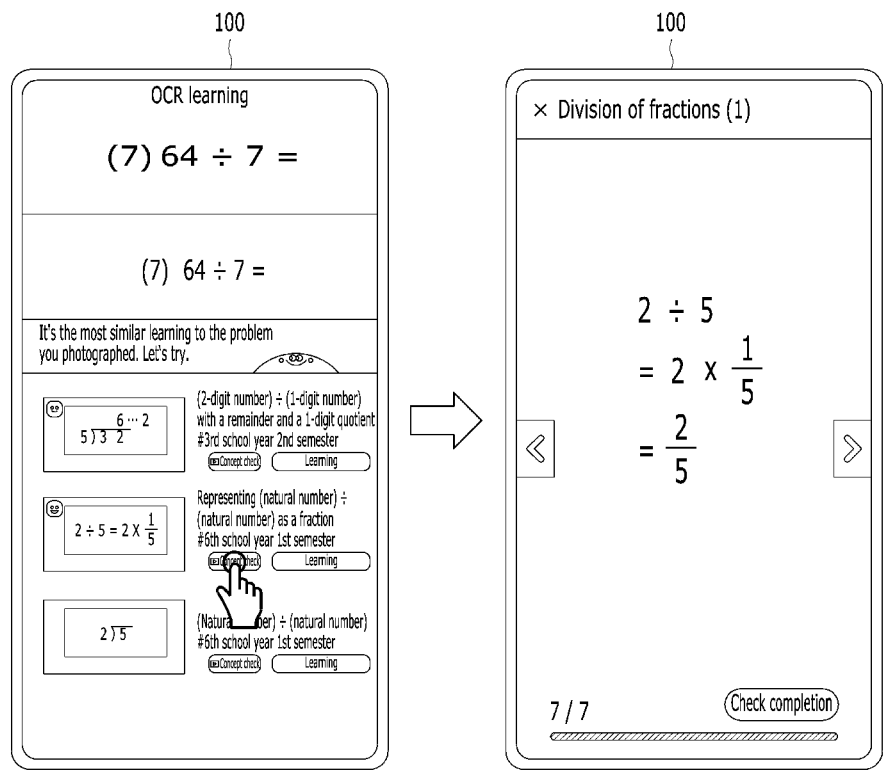

[FIG. 18]

APPARATUS AND METHOD FOR RECOMMENDING LEARNING USING OPTICAL CHARACTER RECOGNITION

TECHNICAL FIELD

The present disclosure relates to a technology for providing learning information related to a problem photographed by a learner.

BACKGROUND ART

Recently, as mobile terminals, such as smartphones, tablets and the like, have become popular, more learning services have been provided via the mobile terminals in more various forms. Learners proceed with learning according to learning curriculums provided through the mobile terminals by the service providers.

In general, a learning curriculum guides learners to learn a learning topic by presenting a problem related to the learning topic after a conceptual explanation of the learning topic.

In the case of mathematics, a number of formulas are presented according to a learning curriculum, and the learner inputs answers for the formulas through his/her mobile terminal. At this time, the learning server scores the answers input by the learner and provides the results to the learner.

However, the conventional learning services are limited to only such an extent that learning topics are simply presented sequentially according to the learning curriculum, and they do not assist learners in finding the learning topic the learners want to selectively learn.

It should be appreciated that the description provided in the background art is intended to help readers understand the background of the invention, and may include matters that are not publicly disclosed prior art.

PRIOR ART DOCUMENTS

Patent Document

Korean Patent No. 10-2284393

SUMMARY OF INVENTION

Technical Problem

The present disclosure is proposed in view of the above circumstances, and an objective of the present disclosure is to provide a learning recommendation apparatus and method for detecting a problem from an image through character recognition and providing at least one sub-topic learning among a plurality of sub-topic learnings related to the detected problem.

As another objective of the disclosure, the learning recommendation apparatus and method assist learners in easily finding a learning topic they want to learn.

Solution to Problem

In order to achieve the above objectives, according to the present disclosure, there is provided a learning recommendation apparatus including: a camera configured to generate a formula image by photographing a region including a formula; a character recognition module configured to read the formula included in the formula image by performing character recognition; a control module configured to transmit a learning topic detection request including the formula, and transmit a recommendation target display request when receiving a learning recommendation output request in response to the learning topic detection request; a recommendation target detection module configured to detect a plurality of learning topics as a recommendation target based on the formula included in the learning topic detection request, to set a priority order of the plurality of learning topics detected as the recommendation target based on a concept distance between a learning history and a learning topic, and to transmit the learning recommendation output request including the plurality of learning topics detected as the recommendation target and the priority order to the control module; and a display configured to output the plurality of learning topics detected as the recommendation target, wherein the display module outputs a learning recommendation screen on which the plurality of learning topics are arranged according to the priority order.

In order to achieve the above objectives, according to the present disclosure, there is provided a learning recommendation method including: generating a formula image by photographing a region including a formula, and transmitting a character recognition request including the formula image; performing text recognition on the formula image, reading the formula included in the formula image, and transmitting a learning recommendation request including the formula; transmitting a learning topic detection request including the formula detected from the learning recommendation request; detecting a plurality of learning topics as a recommendation target based on the formula included in the learning topic detection request; setting priority order of the plurality of learning topics detected as the recommendation target based on a concept distance between a learning history and a learning topic; transmitting a learning recommendation output request including the plurality of learning topics detected as the recommendation target and the priority order; transmitting the recommendation target display request, and outputting the plurality of learning topics detected as the recommendation target wherein the plurality of learning topics are arranged on a learning recommendation screen according to the priority order.

Advantageous Effects

According to the present disclosure, the learning recommendation apparatus and method recommend a learning topic through a single formula photographing, so they can provide an effect that helps a learner easily find a learning topic the learner wants to learn even if the learner does not know the learning topic.

In addition, the learning recommendation apparatus and method derive a concept distance between a learner's learning history and a learning topic which is the recommendation target, and recommend a plurality of learning topics by using the concept distance as a priority order, so they can provide an effect that helps the learner easily learn the learning topic the learner wants to learn.

Besides, the learning recommendation apparatus and method do not provide a solution (correct answer) of the photographed problem, but provide learning information and similar problems related to the photographed problem, so they can provide an effect that leads learners to learn the relevant learning topic rather than simply solving a problem.

BRIEF DESCRIPTION OF DRAWINGS

FIG. 1 is a diagram for explaining a learning recommendation apparatus according to an embodiment of the present disclosure.

FIG. 2 is a block diagram for explaining the configuration of a learning recommendation apparatus according to an embodiment of the present disclosure.

FIG. 3 is a diagram for explaining the learning information database of FIG. 2.

FIGS. 4 and 5 are diagrams for explaining the tree map database of FIG. 2.

FIG. 6 is a view for explaining the learning history database of FIG. 2.

FIG. 7 is a diagram for explaining a recommendation target detection module of FIG. 2.

FIG. 8 is a view for explaining the display of FIG. 2.

FIGS. 9 and 10 are flowcharts for explaining a learning recommendation method according to an embodiment of the present disclosure.

FIGS. 11 to 18 are diagrams for explaining an example of a screen output in each step by the learning recommendation apparatus according to an embodiment of the present disclosure.

DESCRIPTION OF EMBODIMENTS

Hereinafter, preferred embodiments of this disclosure will be described in detail with reference to the attached drawings.

Examples are provided to more fully explain the present disclosure to those of ordinary skill in the art, and the following examples may be modified into various other forms, and the scope of the present disclosure is not limited to the following examples. Rather, these examples are provided to make this disclosure more thorough and complete, and to fully convey the technical idea of the disclosure.

The terms used herein are used to describe specific embodiments and should not be construed as limiting the present disclosure. Also, in this specification, the use of the singular form term may include its corresponding plural singular objects, unless the context clearly indicates otherwise.

The drawings are only for understanding the technical idea of the present disclosure, and should not be construed as limiting the scope of the present disclosure by the drawings. In addition, the relative thickness, length, or relative size in the drawings may be exaggerated for convenience and clarity of description.

A learning recommendation apparatus according to an embodiment of the present disclosure is constituted with a mobile terminal including a camera, such as a smart phone, a tablet and the like. The learning recommendation apparatus may be constituted with a desktop or laptop to which a camera is connected.

Referring to FIG. 1, the learning recommendation apparatus 100 detects a problem region containing a problem from an image of a real teaching material. The learning recommendation apparatus 100 recognizes the problem through an optical character recognition (OCR) for the problem region. The learning recommendation apparatus 100 detects, as a recommendation target, a plurality of learning topics related to the problem recognized through the OCR from among a plurality of stored learning topics. In this regard, the learning recommendation apparatus 100 stores a plurality of learning topics while setting concept distances between the learning topics, and detects the plurality of learning topics as the recommendation target based on the learner's learning history and the concept distance between the learning topics.

The learning recommendation apparatus 100 displays the recommendation target on a screen, and outputs learning information related to the learning topic selected by a learner.

Through this, unlike the prior art that simply provides a solution to the problem photographed by the learner, the learning recommendation apparatus 100 provides the learning related to the problem, so that the learner can easily perform learning related to the desired learning topic.

Referring to FIG. 2, the learning recommendation apparatus 100 includes a database 110, a camera 120, a character recognition module 130, a control module 140, a detection module 150, a display 160, and an input module 170. Here, although the display 160 and the input module 170 are illustrated as being separated in FIG. 2, the present disclosure is not limited thereto and may be configured as a single module, such as a touch screen, that can simultaneously perform screen output and input.

The database 110 stores information for providing a learning recommendation service through character recognition. The database 110 stores learning information to be provided to the learner, a tree map for learning recommendation, and the learner's learning history.

To this end, the database 110 includes a learning information database 112, a tree map database 114, and a learning history database 116.

The learning information database 112 stores the learning information to be provided to learners.

Referring to FIG. 3, the learning information database 112 stores the learning information with learning codes, learning topics, concepts, problem learning, and the like associated with each other. In this case, the concept stored in the learning information database 112 may be link addresses of a web page including a conceptual description of a learning topic, or data composed of text, images and/or the like. The problem learning stored in the learning information database 112 may be a link address of a web page displaying a formula related to the learning topic and allowing a learner to enter the correct answer for the formula, or data including formulas composed of text, images and/or the like.

The tree map database 114 stores the tree map in which concept distances between learning subjects are set. In this regard, the concept distance is a numerical value indicating the degree of concept relevance between two learning topics.

The tree map database 114 may store the tree map in which concept distances between the plurality of learning topics are set by means of absolute distances. That is, the tree map database 114 sets the concept distance by means of an absolute distance having the same distance according to the order on the learning curriculum. When storing, the tree map database 114 sets the concept distances between every two adjacent learning topics in the learning curriculum to be the same as an absolute distance of "1".

Referring to FIG. 4 illustrating seven learning topics M0101 to M0107, the tree map database 114 sets the concept distances D12, D23, D34, D45, D56 and D67 between every two adjacent learning topics to the same distance, i.e., "1."

Accordingly, the concept distance D13 between two learning topics whose learning codes are M0101 and M0103 is set to "2", the concept distance D14 between two learning topics whose learning codes are M0101 and M0104 is set to "3", the concept distance D15 between two learning topics whose learning codes are M0101 and M0105 is set to "4", the concept distance D16 between two learning topics whose learning codes are M0101 and M0106 is set to "5", and the concept distance D17 between two learning topics whose learning codes are M0101 and M0107 is set to "6."

The tree map database 114 may store the tree map in which concept distances between the plurality of learning topics are set by means of variable distances. That is, the tree map database 114 sets the concept distance between two adjacent learning topics in a learning curriculum to a value of between 0 and 2 inclusive, which is a variable distance, and the concept distances between every two adjacent learning subjects may be different from each other.

Referring to FIG. 5 illustrating three learning topics M0101 to M0103, the tree map database 114, when storing, sets the concept distance D12 between two learning subjects whose learning codes are M0101 and M0102 and which have relatively high concept relevance to each other, to be shorter than concept distance D13 between two learning subjects whose learning codes are M0101 and M0103 and which have relatively low concept relevance to each other.

The tree map database 114, when storing, sets the concept distance D12 between two learning subjects whose learning codes are M0101 and M0102 and which have relatively high concept relevance to each other, to be shorter than concept distance D23 between two learning subjects whose learning codes are M0102 and M0103 and which have relatively low concept relevance to each other.

In this regard, the concept distance may be set differently depending on the learner as a two-dimensional or n-dimensional distance. Also, the concept distance may be changed according to a change in a learner's learning history, school year (or grade), and the like.

The tree map database 114 transmits a response signal including the concept distance in response to the concept distance detection request of the recommendation target detection module 152. The tree map database 114 detects a learning topic and a learning history from a concept distance detection request. The tree map database 114 detects a concept distance corresponding to the learning subject and the learning history. The tree map database 114 transmits a response signal including the detected concept distance to the recommendation target detection module 152.

The learning history database 116 associates the learning history with the learner information and stores it. As an example, referring to FIG. 6, the learning history database 116 stores the learning history associated with a learner code, a learner's name, a school year, the learning completion, the learning process, and the like.

The learning history database 116 detects the learning history in response to the learning history detection request of the recommendation target detection module 152. At this time, the learning history database 116 detects the learning history including the learner code included in the learning history detection request. The learning history database 116 generates a response including the detected learning history and transmits it to the recommendation target detection module 152.

The camera 120 photographs a region in which the real teaching material is disposed in response to a formula photographing request from the control module 140. The camera 120 creates a formula image by photographing the region including the formula of the real teaching material. The camera 120 may generate a formula image by photographing a formula written by a learner. The camera 120 generates a character recognition request including the formula image, and transmits the character recognition request to the character recognition module 130. In this regard, the image is, for example, a still image.

The character recognition module 130 recognizes a formula included in the formula image in response to the character recognition request from the camera 120. The character recognition module 130 detects the formula image from the character recognition request. The character recognition module 130 reads the formula through character recognition of the formula image.

The character recognition module 130 is configured with an optical character recognition (OCR) module, and reads a formula in the real teaching material using light. At this time, the character recognition module 130 reads the formula printed on the real teaching material through the pattern matching and stroke analysis methods. The character recognition module 130 may also read a formula written by a learner through a handwriting recognition method.

The character recognition module 130 generates a learning recommendation request including the read formula. The character recognition module 130 transmits a learning recommendation request to the control module 140.

The control module 140 transmits the formula photographing request to the camera 120. That is, when the learner presses the photographing button of the apparatus after focusing the apparatus on the region including the formula for learning, the control module 140 recognizes this and transmits the formula photographing request to the camera 120.

The control module 140 generates the learning topic detection request in response to the learning recommendation request of the character recognition module 130. The control module 140 detects the formula from the learning recommendation request. The control module 140 generates the learning topic detection request including the detected formula and transmits it to the detection module 150.

The control module 140 controls the display 160 to output the learning topic as the recommendation object on the screen in response to the learning recommendation output request of the learning detection module 154. That is, the control module 140 detects the learning topic and priority order from the learning recommendation output request. The control module 140 sets the display order of the learning topics as the recommendation object based on the priority order. The control module 140 generates a recommendation target display request including the formula image, the formula, the learning topic, and the display order, and transmits it to the display 160. At this time, if the learning evaluation result is included in the learning recommendation output request, the control module 140 generates a recommendation target display request including a learning topic matched with the learning evaluation result.

The control module 140 generates a learning information detection request including a learning code in response to the input sensing message of the input module 170. The control module 140 detects a learner input from the input sensing message, and detects one learning code from among the learning topics (i.e., recommendation target) displayed on the learning recommendation screen based on the learner input. The control module 140 generates a learning information detection request including a learning code and a learner input, and transmits it to the learning detection module 154.

The control module 140 generates a learning information output request in response to the learning detection completion message of the learning detection module 154. That is, the control module 140 detects a link (a concept or problem is connected to) or data of a learning topic from the learning detection completion message of the learning detection module 154. The control module 140 generates the learning information output request including the detected link or data, and transmits it to the display 160.

The detection module 150 detects a learning topic to be recommended to a learner according to the request from the control module 140. The detection module 150 detects one or more learning topics as a recommendation target. The detection module 150 sets the concept distance based on the tree map stored in the tree map database 114, the recommendation target, and the learning history, and sets the priority order based on the concept distance. To this end, the detection module 150 includes a recommendation target detection module 152 and a learning detection module 154.

The recommendation target detection module 152 detects one or more learning topics as the recommendation target from the database 110 in response to the learning topic detection request of the control module 140. That is, the recommendation target detection module 152 detects a formula from the learning topic detection request of the control module 140. The recommendation target detection module 152 detects one or more learning topics including the concept of the detected formula from the learning information database 112. The recommendation target detection module 152 sets one or more detected learning topics as the recommendation target. The recommendation target detection module 152 transmits the recommendation learning output request including the recommendation target to the control module 140.

First, the recommendation target detection module 152 detects the formula from the learning topic detection request in response to the learning topic detection request of the control module 140. The recommendation target detection module 152 transmits the learning topic detection request including the detected formula to the learning information database 112.

The recommendation target detection module 152 receives, from the learning information database 112, a response signal to the learning topic detection request, wherein the response signal includes one or more learning topics related to the formula. The recommendation target detection module 152 detects one or more learning topics from the response signal.

The recommendation target detection module 152 transmits the learning history detection request including the learner code to the learning history database 116. The recommendation target detection module 152 receives, from the learning history database 116, the learning history of the learner corresponding to the learner code in response to the learning history detection request.

The recommendation target detection module 152 transmits a concept distance detection request including one or more learning topics and the learning history to the tree map database 114. The recommendation target detection module 152 receives, from the tree map database 114, the response signal to the concept distance detection request, wherein the response signal includes the concept distance between each learning topic and the learning history.

The recommendation target detection module 152 sets the priority orders of the learning topics detected as the recommendation target, based on the concept distances between the respective learning topics and the learning history. In this regard, the recommendation target detection module 152 sets the priority orders of the learning topics detected as the recommendation target so that the smaller the concept distance from the learning history is, the higher the priority order is. At this time, the recommendation target detection module 152 may set the priority orders of learning topics that are recommendation target in a different order according to learners.

As an example, referring to FIG. 7, suppose that learner A's recent learning history has a learning code of "G05_0_1", and learning topics whose learning codes are "G02_0_2" and "G22_0_2" are detected as the recommendation target.

The recommendation target detection module 152 sets the concept distance between the two learning subjects whose learning codes are "G05_0_1" and "G02_0_2" to "3". The recommendation target detection module 152 sets the concept distance between the two learning subjects whose learning codes are "G05_0_1" and "G22_0_2" to "14".

The concept distance of the learning topic with the learning code "G02_0_2" is set shorter than the concept distance of the learning topic with the learning code "G22_0_2", the recommendation target detection module 152 sets the priority order of the learning topic with the learning code "G02_0_2" to be higher than the priority order of the learning topic with the learning code "G22_0_2".

On the other hand, suppose that learner B's recent learning history has a learning code of "G18_0_1", and learning topics whose learning codes are "G02_0_2" and "G22_0_2" are detected as the recommendation target.

The recommendation target detection module 152 sets the concept distance between the two learning subjects whose learning codes are "G18_0_1" and "G02_0_2" to "13". The recommendation target detection module 152 sets the concept distance between the two learning subjects whose learning codes are "G018_0_1" and "G22_0_2" to "4".

The concept distance of the learning topic with the learning code "G02_0_2" is set longer than the concept distance of the learning topic with the learning code "G22_0_2", the recommendation target detection module 152 sets the priority order of the learning topic with the learning code "G02_0_2" to be lower than the priority order of the learning topic with the learning code "G22_0_2".

Thus, even if the same learning topics are detected as recommendation targets for different learners, the recommendation target detection module 152 may set different priority orders for the learning topics detected as the recommendation targets for each learner.

When the priority order setting of the learning topics that is the recommendation target has been completed, the recommendation target detection module 152 generates the learning recommendation output request including the learning topics for which the priority orders have been set, and transmits it to the control module 140. In this regard, when the learner's learning history for the learning topic set as the recommendation target exists, the recommendation target detection module 152 generates the learning recommendation output request including a learning evaluation result for the learning topic.

The learning detection module 154 detects the learning information from the database 110 in response to the learning information detection request of the control module 140. That is, the learning detection module 154 detects the learning code from the learning information detection request. The learning detection module 154 detects the concept and problem learnings associated with the detected learning code.

The learning detection module 154 detects the learner input from the learning information detection request. The learning detection module 154 detects, from among the detected concept and problem learnings, one corresponding to the learner input as the learning information.

The learning detection module 154 generates the learning detection completion message including the detected learning information, and transmits it to the control module 140.

In this regard, the learning detection module 154 transmits to the control module 140 the concept detection message including a link or data indicating the concept of the learning topic, or the problem detection message including a link or data connected to a problem of the learning topic.

The display 160 outputs the learning topics which are the recommendation target in response to the recommendation target display request of the control module 140. That is, the display 160 detects the learning topic and the display order from the recommendation target display request. The display 160 generates the learning recommendation screen on which learning topics are sequentially arranged according to a display order. In this regard, the display 160 may generate a learning recommendation screen on which a formula image, a formula, and a learning history are additionally displayed.

For example, referring to FIG. 8, the display 160 outputs a learning recommendation screen divided into a first region A1, a second region A2, and a third region A3. The display 160 outputs the formula image photographed by the camera 120 to the first region A1. The display 160 outputs the formula recognized by the character recognition module 130 to the second region A2. The display 160 outputs the learning topics as the recommendation target to the third region A3, and outputs the learning topics as the recommendation target to be arranged according to the display order (i.e., priority order).

When the learner's learning history exists among the learning topics displayed in the third region A3, the display 160 outputs the learning evaluation result to the third region A3. In this case, the display 160 outputs the learning evaluation result in the form of an icon, and outputs the learning evaluation results to be displayed as different icons S according to the learning evaluation results (e.g., high, middle, low).

Meanwhile, the display 160 outputs the learning recommendation screen on which a first button for selecting concept learning of a learning topic as a recommendation target and a second button for selecting problem learning are displayed in the third region A3.

In this regard, when a plurality of learners photograph the same formula, the same learning topic is displayed in the third region A3 of the learning recommendation screen, but the learning topics may be arranged in a different order (display order) for each learner.

The display 160 outputs a concept or problem related to a recommendation target (i.e., a learning topic) selected by the learner in response to the learning information output request of the control module 140. The display 160 outputs the learning information by linking the link included in the learning information output request or by outputting data included in the learning information output request.

The input module 170 senses a learner's input after the learning recommendation screen is output on the display 160. The input module 170 senses the learner input generated in a region of the learning recommendation screen, in which the learning topics as the recommendation target are displayed. The input module 170 transmits an input sensing message including the learner input to the control module 140. Here, the learner input may be a coordinate or specific command (i.e., concept check or learning) on the learning recommendation screen.

Hereinafter, a learning recommendation method according to an embodiment of the present disclosure will be described in detail with reference to the accompanying drawings. FIGS. 9 and 10 are flowcharts for explaining a learning recommendation method according to an embodiment of the present disclosure.

Referring to FIGS. 9 and 10, when the learner presses the photographing button of the apparatus after focusing the apparatus on the region including the formula for learning, the control module 140 recognizes this and transmits the formula photographing request to the camera 120 (S110).

After receiving the formula photographing request, the camera 120 creates a formula image by photographing the formula (S120). That is, camera 120 creates the formula image by photographing the region including the formula of the real teaching material. The camera 120 may generate a formula image by photographing a formula written by a learner.

The camera 120 generates the character recognition request including the formula image, and transmits the character recognition request to the character recognition module 130 (S130).

The character recognition module 130 performs text recognition (OCR) on the formula image in response to the character recognition request from the camera 120, and reads the formula included in the formula image as a result of character recognition (S140).

The character recognition module 130 generates the learning recommendation request including the read formula, and transmits it to the control module 140 (S150).

After receiving the learning recommendation request from the character recognition module 130, the control module 140 detects the formula from the learning recommendation request, generates the learning topic detection request including the detected formula, and transmits it to the recommendation target detection module 152 (S160).

The recommendation target detection module 152 detects a plurality of learning topics related to the formula as the recommendation target in response to the recommendation target detection request of the control module 140 (S170). That is, the recommendation target detection module 152 detects the formula from the learning topic detection request in response to the learning topic detection request of the control module 140. The recommendation target detection module 152 transmits the learning topic detection request including the detected formula to the learning information database 112. The recommendation target detection module 152 receives, from the learning information database 112, a response signal to the learning topic detection request, wherein the response signal includes one or more learning topics related to the formula. The recommendation target detection module 152 detects one or more learning topics from the response signal.

The recommendation target detection module 152 detects the learner's learning history (S180). That is, the recommendation target detection module 152 transmits the learning history detection request including the learner code to the learning history database 116. The recommendation target detection module 152 receives, from the learning history database 116, the learning history of the learner corresponding to the learner code in response to the learning history detection request.

The recommendation target detection module 152 detects a concept distance between the recommendation target learning topic and the learning history (S190). That is, the recommendation target detection module 152 transmits the concept distance detection request including one or more learning topics and the learning history to the tree map database 114. The recommendation target detection module 152 receives, from the tree map database 114, the response signal to the concept distance detection request, wherein the response signal includes the concept distance between each learning topic and the learning history.

The recommendation target detection module 152 sets the priority orders of the learning topics detected as the recommendation target, based on the concept distances between the respective learning topics and the learning history (S200). In this regard, the recommendation target detection module 152 sets the priority orders of the learning topics detected as the recommendation target so that the smaller the concept distance from the learning history is, the higher the priority order is.

The control module 140 generates the recommendation target display request for requesting display of the recommendation target, and transmits the generated recommendation target display request to the display 160 (S210). That is, the control module 140 detects the learning topic and priority order from the learning recommendation output request. The control module 140 sets the display order of the learning topics as the recommendation object based on the priority order. The control module 140 generates a recommendation target display request including the formula image, the formula, the learning topic, and the display order, and transmits it to the display 160.

The display 160 outputs the recommended learning topics to be sequentially displayed according to the priority order (S220). The display 160 detects the learning topic and the display order from the recommendation target display request. The display 160 generates the learning recommendation screen on which learning topics are sequentially arranged according to a display order.

Meanwhile, in step S220, if the learning evaluation result is included in the learning recommendation output request, the control module 140 generates the recommendation target display request including the learning topic matched with the learning evaluation result. The display 160 generates a learning recommendation screen on which a formula image, a formula, and a learning history are additionally displayed (see FIG. 8).

The input module 170 senses a learner's input after the learning recommendation screen is output on the display 160. When the input module 170 senses the learner input occurring in the region of the learning recommendation screen, on which the learning topics as the recommendation target are displayed (S230; Yes), the control module 140 transmits a learning information detection request including a learning code to the learning detection module 154 (S240). That is, when the input module 170 senses the learner input, the control module 140 generates the learning information detection request including the learning code in response to the input sensing message of the input module 170. The control module 140 detects a learner input from the input sensing message, and detects one learning code from among the learning topics (i.e., recommendation target) displayed on the learning recommendation screen based on the learner input. The control module 140 generates a learning information detection request including a learning code and a learner input, and transmits it to the learning detection module 154.

The learning detection module 154 detects learning information from the learning information database 112 in response to the learning information detection request of the control module 140 (S250). That is, the learning detection module 154 detects the learning code from the learning information detection request. The learning detection module 154 detects the concept and problem learnings associated with the detected learning code. The learning detection module 154 detects the learner input from the learning information detection request. The learning detection module 154 detects, from among the detected concept and problem learnings, one corresponding to the learner input as the learning information.

The learning detection module 154 generates the learning detection completion message including the detected learning information, and transmits it to the control module 140 (S260). In this regard, the learning detection module 154 transmits to the control module 140 the concept detection message including a link or data indicating the concept of the learning topic, or the problem detection message including a link or data connected to a problem of the learning topic.

The control module 140 transmits the learning information output request to the display 160 in response to the learning detection completion message of the learning detection module 154 (S270). That is, the control module 140 detects a link (a concept or problem is connected to) or data of a learning topic from the learning detection completion message of the learning detection module 154. The control module 140 generates the learning information output request including the detected link or data, and transmits it to the display 160.

The display 160 outputs a concept or problem related to a recommendation target (i.e., a learning topic) selected by the learner in response to the learning information output request of the control module 140 (S280). The display 160 outputs the learning information by linking the link included in the learning information output request or by outputting data included in the learning information output request.

Figure 12:
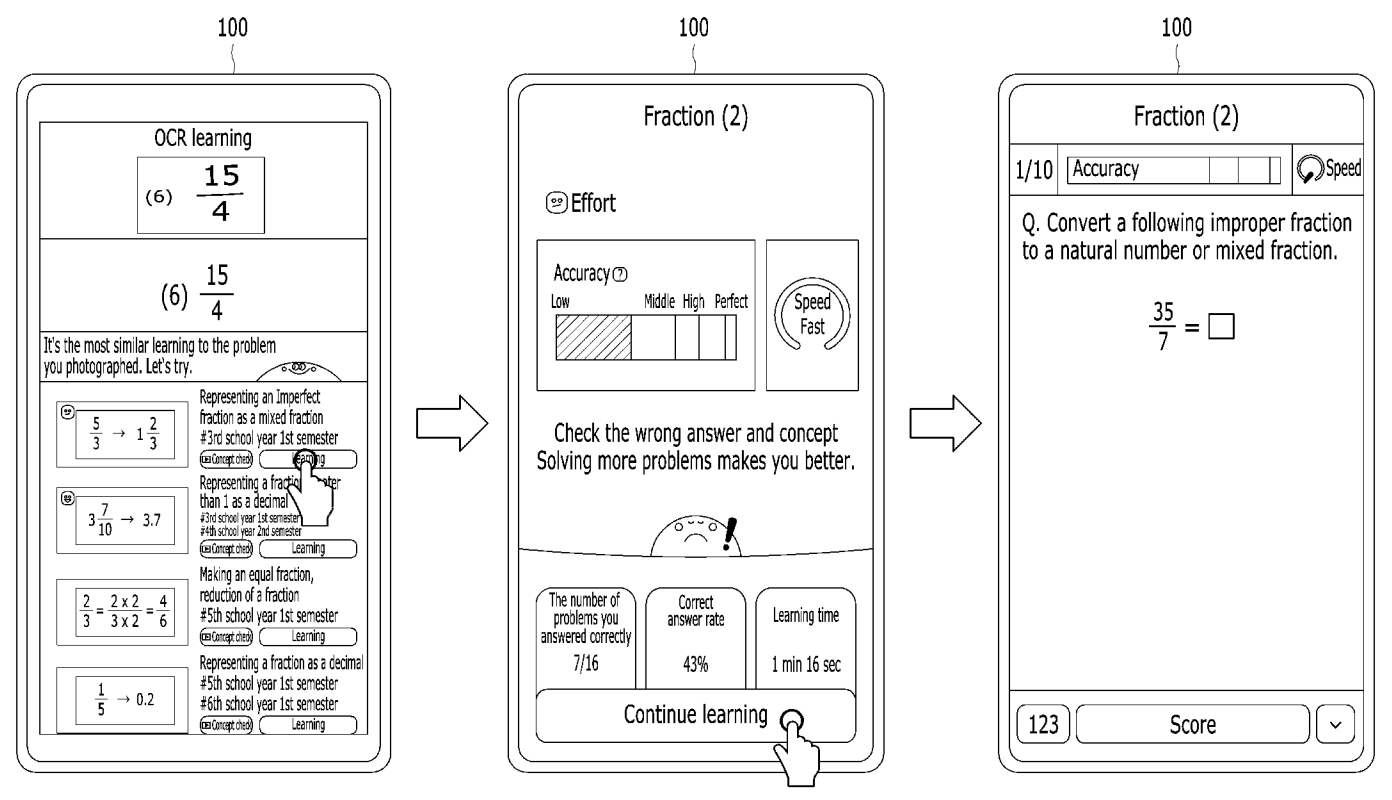

FIGS. 11 to 18 are diagrams for explaining an example of a screen output in each step by the learning recommendation apparatus 100 according to an embodiment of the present disclosure.

Referring to FIG. 11, when the learner uses the learning recommendation apparatus 100 to photograph $$"\frac{15}{4}"$$

in the formulas of the real teaching material, in step S220, the learning recommendation apparatus 100 outputs the screen on which a learning image including the formula $$"\frac{15}{4}"$$

is output in the first region, the formula $$"\frac{15}{4}"$$

read through the character recognition is output in the second region, and a plurality of learning topics as the recommendation target are output in the third region. At this time, the learning recommendation apparatus 100 outputs the screen on which a plurality of learning topics are sequentially arranged as the recommendation target according to the priority order in the third region.

When there is a learning topic in which the learner's learning history exists, the learning recommendation apparatus 100 outputs the screen on which the learning topic including the learning evaluation result in the form of an icon is displayed. In the learning topic displayed in the third region, the first button for the concept check and the second button for the problem learning are output together with the learning topic.

When the learner touches the first button to check the concept of the recommendation target (i.e., the learning topic "Expressing an improper fraction as a mixed fraction") displayed at the uppermost portion, the learning recommendation apparatus 100 outputs the screen explaining the concept of the learning topic "Expressing an Improper Fraction as a Mixed Fraction."

Referring to FIG. 12, when the learner touches the second button for the problem learning of the recommendation target (i.e., the learning topic "Expressing an improper fraction as a mixed fraction") displayed at the uppermost portion, the learning recommendation apparatus 100 outputs the screen on which the learning history of the learning topic "Expressing an improper fraction as a mixed fraction" among the learner's learning histories is displayed. At this time, the learning recommendation apparatus 100 outputs the screen on which the learning history is displayed with red as the background color when effort of the learner is required because the learner's correct answer rate is low.

The learning recommendation apparatus 100 outputs a "continue learning" button together with the learning history, and when the learner touches the "continue learning" button, the learning recommendation apparatus 100 outputs the screen requesting the learner to input the correct answer of $$"\frac{35}{7}",$$

which is the problem of the learning topic "Expressing an improper fraction as a mixed fraction."

Referring to FIG. 13, when the learner touches the first button for the concept check of the recommendation target displayed second from the uppermost portion (i.e., the learning topic "Expressing a fraction greater than 1 as a decimal"), the learning recommendation apparatus 100 outputs the screen explaining the concept of the learning topic "Expressing a fraction greater than 1 as a decimal."

Figure 14:
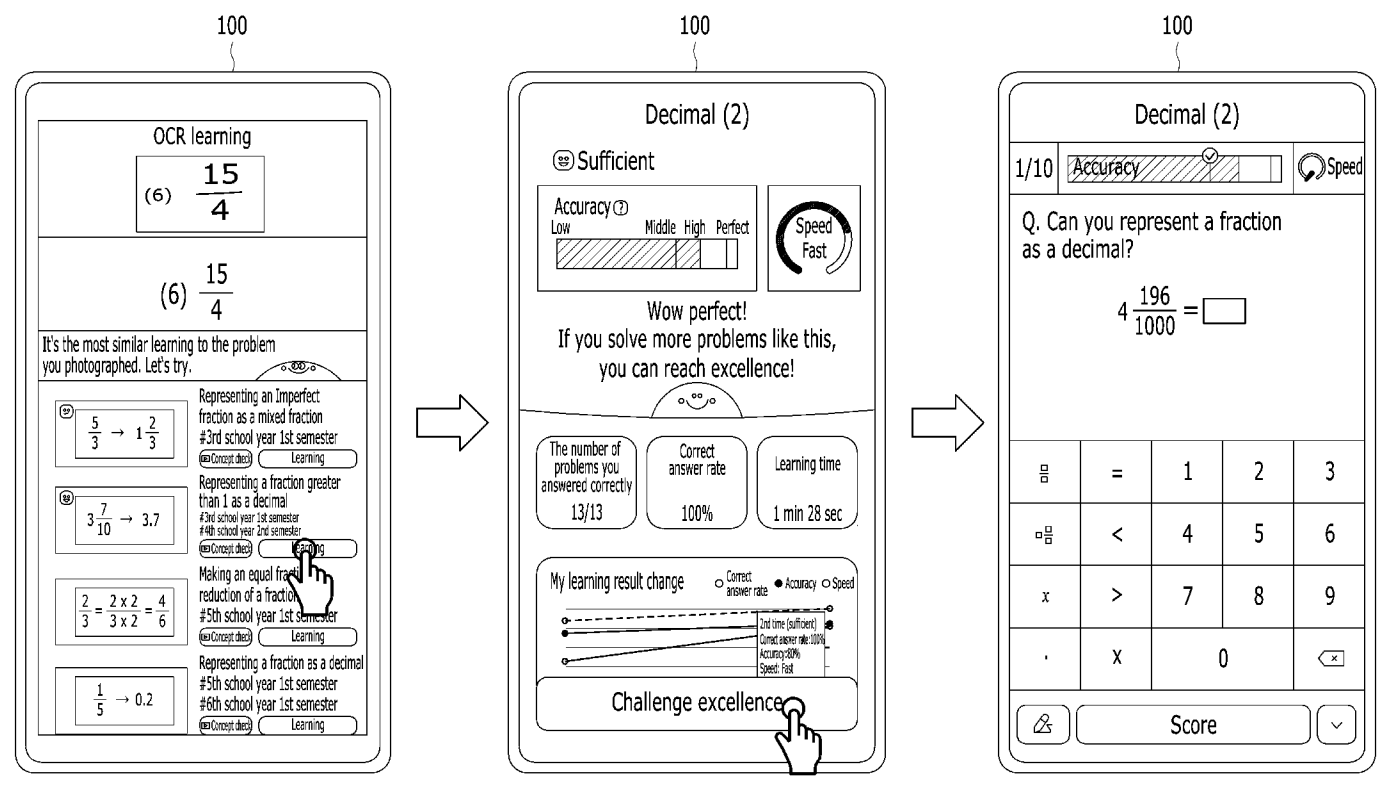

Referring to FIG. 14, when the learner touches the second button for the problem learning of the recommendation target (i.e., the learning topic "Expressing a fraction greater than 1 as a decimal") displayed second from the uppermost portion, the learning recommendation apparatus 100 outputs the screen on which the learning history of the learning topic "Expressing an improper fraction as a mixed fraction" among the learner's learning histories is displayed. At this time, the learning recommendation apparatus 100 outputs the screen displaying the learning history with green as the background color when the learner's correct answer rate is high and in the "sufficient" state.

At this time, the learning recommendation apparatus 100 outputs a "Challenge excellence" button for problem learning together with the learning history to allow the learner to challenge the "excellence" state one step higher than the "sufficient" state, and when the learner touches the "Challenge excellence" button, the screen is displayed requesting the learner to input the correct answer of $$"4\frac{196}{1000}",$$

which is the problem of the learning topic "Expressing a fraction greater than 1 as a decimal."

Referring to FIG. 15, when the learner uses the learning recommendation apparatus 100 to photograph "64÷7" in the formulas of the real teaching material, in step S220, the learning recommendation apparatus 100 outputs the screen on which a learning image including the formula "64÷7" is output in the first region, the formula "64÷7" read through the character recognition is output in the second region, and a plurality of learning topics as the recommendation target are output in the third region. At this time, the learning recommendation apparatus 100 outputs the screen on which a plurality of learning topics are sequentially arranged as the recommendation target according to the priority order in the third region.

When there is a learning topic in which the learner's learning history exists, the learning recommendation apparatus 100 outputs the screen on which the learning topic including the learning evaluation result in the form of an icon is displayed. In the learning topic displayed in the third region, the first button for the concept check and the second button for the problem learning are output together with the learning topic.

When the learner touches the first button to check the concept of the recommendation target (i.e., the learning topic "(2-digit number)÷(1-digit number) with a 1-digit quotient and a remainder") displayed at the uppermost portion, the learning recommendation apparatus 100 outputs the screen explaining the concept of the learning topic "(2-digit number)÷(1-digit number) with a 1-digit quotient and a remainder."

Figure 16:
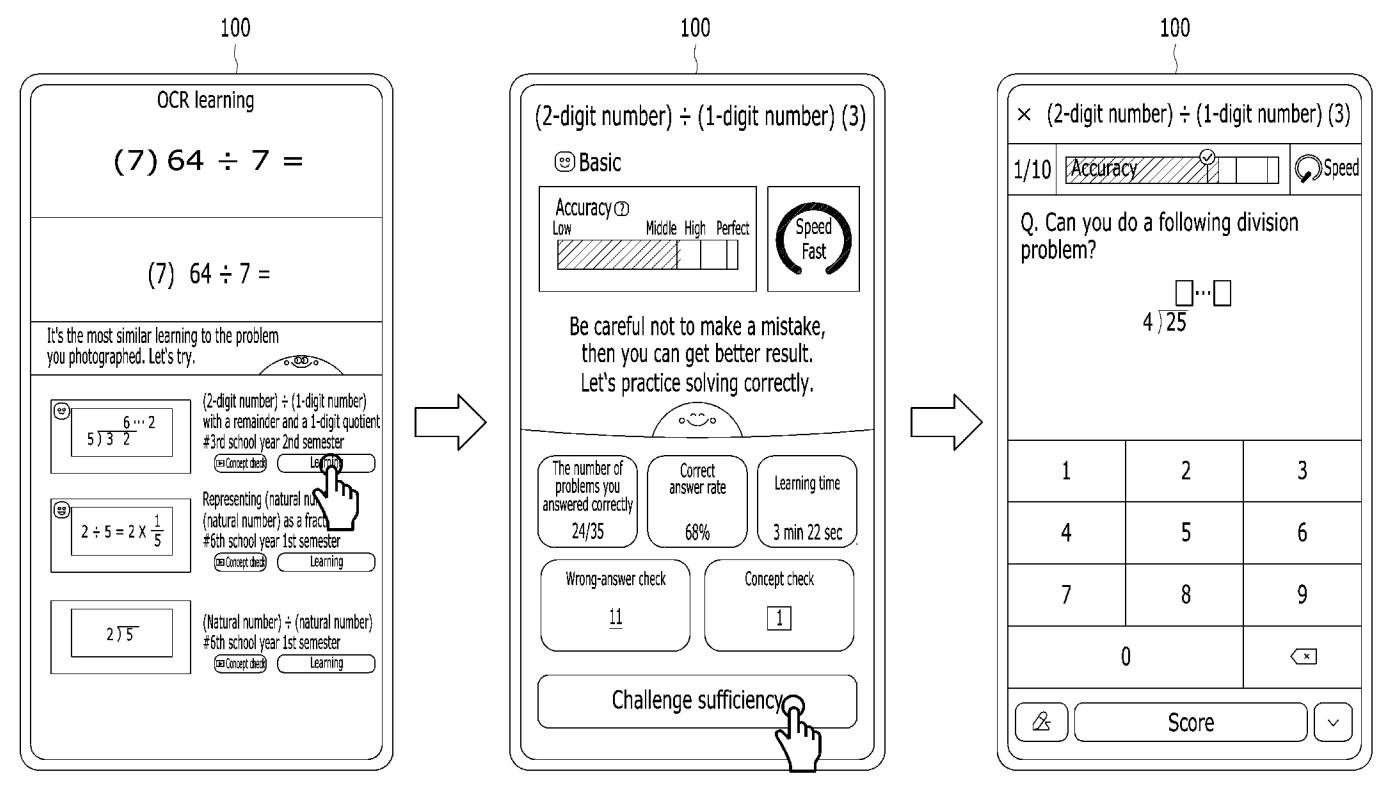

Referring to FIG. 16, when the learner touches the second button for the problem learning of the recommendation target (i.e., the learning topic "(2-digit number)÷(1-digit number) with a 1-digit quotient and a remainder") displayed at the uppermost portion, the learning recommendation apparatus 100 outputs the screen on which the learning history of the learning topic "(2-digit number)÷(1-digit number) with a 1-digit quotient and a remainder" among the learner's learning histories is displayed. At this time, the learning recommendation apparatus 100 outputs the screen displaying the learning history with orange as the background color when the learner's correct answer rate is normal and in the "basic" state.

The learning recommendation apparatus 100 outputs a "Challenge sufficiency" button along with the learning history, and when the learner touches the "Challenge sufficiency" button, the learning recommendation apparatus 100 outputs the screen requesting the learner to input the quotient and remainder along with "25÷9", which is the problem of the learning topic "(2-digit number)÷(1-digit number) with a 1-digit quotient and a remainder."

Referring to FIG. 17, when the learner touches the first button for the concept check of the recommendation target displayed second from the uppermost portion (i.e., learning topic "Expressing (Natural number)÷(Natural number) as a Fraction"), the learning recommendation apparatus 100 outputs the screen explaining the concept of the learning topic "Expressing (Natural number)÷(Natural number) as a Fraction."

Figure 18:
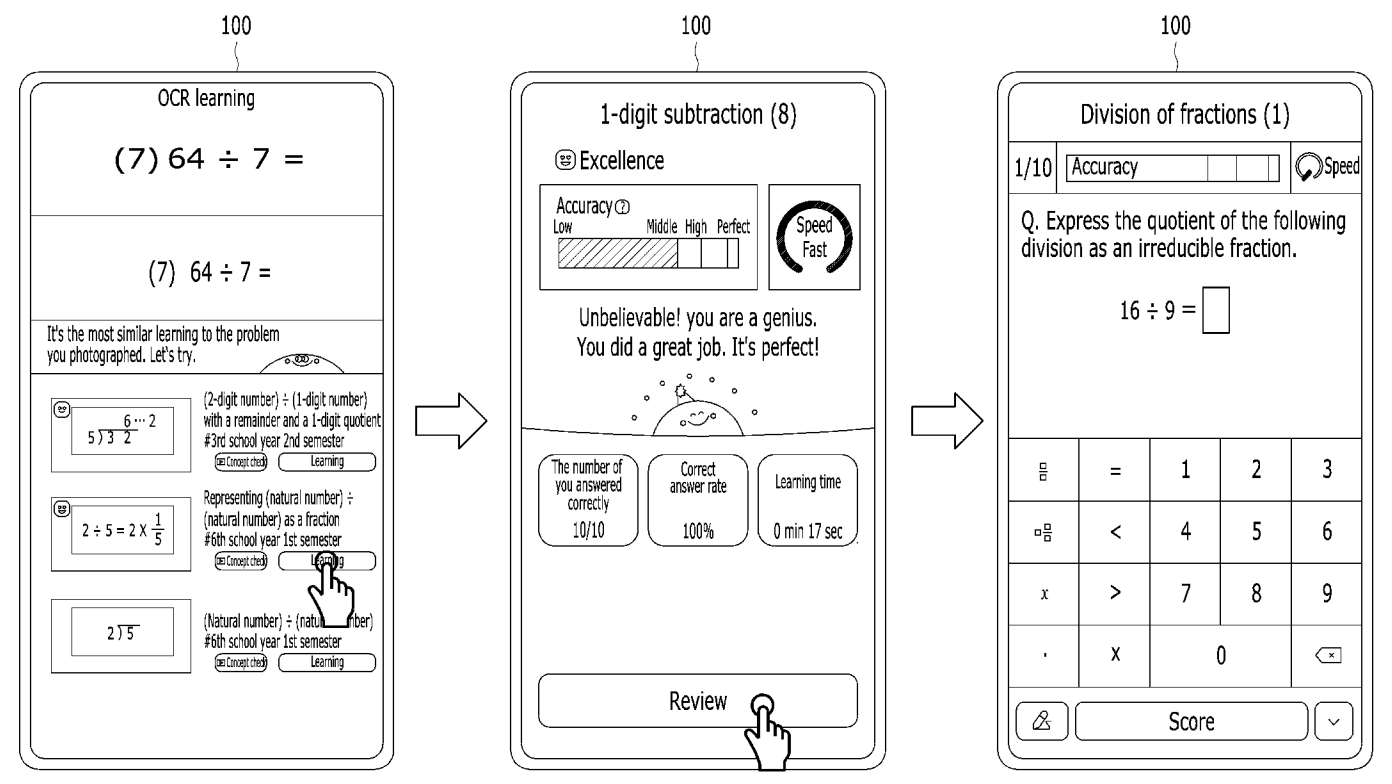

Referring to FIG. 18, when the learner touches the second button for the problem learning of the recommendation target (i.e., the learning topic "Expressing (Natural number) ÷(Natural number) as a fraction") displayed second from the uppermost portion, the learning recommendation apparatus 100 outputs the screen on which the learning history of the learning topic "Expressing (Natural number)÷(Natural number) as a fraction" among the learner's learning histories is displayed. At this time, the learning recommendation apparatus 100 outputs the screen displaying the learning history with purple as the background color when the learner's correct answer rate is high, the learning time is short and in the "excellent" state.

At this time, the learning recommendation apparatus 100 outputs a "Review" button for problem review together with the learning history, and when the learner touches the "Review" button, the learning recommendation apparatus 100 outputs the screen requesting the learner to input the correct answer of "16÷9", which is a problem of the learning topic "Expressing (Natural number)÷(Natural number) as a fraction."

Thus, unlike the conventional method that simply provides a solution (correct answer) to a photographed problem, the learning recommendation apparatus and method according to an embodiment of the present disclosure do not provide a solution (correct answer) of a photographed problem, but guides a learner to learning of a corresponding learning topic rather than a simple problem solving by providing learning information related to a photographed problem and a similar problem.

The above description is merely illustrative of the technical idea of the present disclosure, and various modifications and changes can be made by those of ordinary skill in the art to which the present disclosure pertains, without departing from the essential characteristics of the present disclosure. Accordingly, the embodiments disclosed in the present disclosure are not for limiting, but for explaining the technical spirit of the present disclosure, and the scope of the technical idea of the present disclosure is not limited by these embodiments. The protection scope of the present disclosure should be construed by the following claims, and all technical ideas within the scope equivalent thereto should be construed as being included in the scope of the present disclosure.

REFERENCE SIGN LIST

| | |
|---|---|
| 100: Learning recommendation apparatus | 110: Database |
| 112: Learning information database | 114: Tree map database |
| 116: Learning history database | 120: Camera |
| 130: Character recognition module | 140: Control module |
| 150: Detection module | |
| 152: Recommendation target detection module | |
| 154: Learning detection module | 160: Display |
| 170: Input module | |

The invention claimed is:

1. A learning recommendation apparatus comprising:
a camera configured to generate a formula image by photographing a region including a formula in response to a formula photographing request, and to transmit a character recognition request including the formula image;
a character recognition module configured to read the formula included in the formula image by performing character recognition on the formula image in response to the character recognition request from the camera, and to transmit a learning recommendation request including the formula;
a control module configured to transmit the formula photographing request to the camera, to detect the formula from the learning recommendation request in response to the learning recommendation request of the character recognition module, to transmit a learning topic detection request including the formula, and to transmit a recommendation target display request when receiving a learning recommendation output request in response to the learning topic detection request;
a recommendation target detection module configured to detect a plurality of learning topics as a recommendation target based on the formula included in the learning topic detection request in response to the learning topic detection request of the control module, to set a priority order of the plurality of learning topics detected as the recommendation target based on a concept distance between a learning history and a learning topic, and to transmit the learning recommendation output request including the plurality of learning topics detected as the recommendation target and the priority order to the control module; and
a display configured to output the plurality of learning topics detected as the recommendation target in response to the recommendation target display request of the control module, wherein the display outputs a learning recommendation screen on which the plurality of learning topics are arranged according to the priority order, and
wherein the recommendation target detection module is further configured to:
detect the formula detected from the learning topic detection request, and detect the plurality of learning topics including a concept of the formula, as the recommendation target;
set the concept distance between the learning topic detected as the recommendation target and the learning topic corresponding to the learner's recent learning history, based on the tree map stored in the tree map database; and
set the priority order to the plurality of learning topics based on the concept distance between the learning topic corresponding to the learner's recent learning history and the learning topic detected as the recommendation target.

2. The learning recommendation apparatus of claim 1, further comprising a tree map database configured to store a tree map in which a same concept distance is set for a plurality of learning topics included in a learning curriculum, so that the concept distance of adjacent learning subjects is set equal to the concept distance of two other adjacent learning subjects.

3. The learning recommendation apparatus of claim 1, further comprising a tree map database configured to store a tree map in which different concept distances are set for a plurality of learning topics included in a learning curriculum, so that the concept distance of adjacent learning subjects is set different from the concept distance of two other adjacent learning subjects.

4. The learning recommendation apparatus of claim 1, further comprising a tree map database that stores a tree map in which concept distances set to a plurality of learning topics included in a learning curriculum are different for each learner.

5. The learning recommendation apparatus of claim 1, further comprising:
an input module configured to sense the learner input generated in a region of the learning recommendation screen output by the display, in which the learning topics as the recommendation target are displayed, and to transmit an input sensing message including the learner input to the control module; and a learning detection module configured to detect learning information linked to a learning code included in a learning information detection request in response to the learning information detection request, and to transmit a learning detection completion message including the learning information, wherein the control module transmits the learning information detection request including the learning code of one of the plurality of learning topics displayed on the learning recommendation screen to the learning detection module in response to the input sensing message of the input module, and generates a learning information output request including the learning information in response to a learning detection completion message of the learning detection module and transmits it to the display, and wherein the display outputs the learning information in response to the learning information output request of the control module.

6. The learning recommendation apparatus of claim 1, wherein the display outputs the formula image generated by the camera to a first region of the learning recommendation screen, outputs the formula recognized by the character recognition module to a second region of the learning recommendation screen, and outputs the plurality of learning topics detected as the recommendation target by the recommendation target detection module to a third region of the learning recommendation screen.

7. A learning recommendation method comprising:
generating a formula image by a camera photographing a region including a formula when receiving a formula photographing request, and transmitting a character recognition request including the formula image;
performing, based on the character recognition request, text recognition on the formula image, reading the formula included in the formula image, and transmitting a learning recommendation request including the formula;
transmitting, based on the learning recommendation request, a learning topic detection request including the formula detected from the learning recommendation request;
detecting, based on the learning topic detection request, a plurality of learning topics as a recommendation target based on the formula included in the learning topic detection request;
setting priority order of the plurality of learning topics detected as the recommendation target based on a concept distance between a learning history and a learning topic;
transmitting a learning recommendation output request including the plurality of learning topics detected as the recommendation target and the priority order;
transmitting, based on the learning topic detection request, a recommendation target display request; and
outputting, via a display based on the recommendation target display request, the plurality of learning topics detected as the recommendation target, wherein the display outputs a learning recommendation screen on which the plurality of learning topics are arranged according to the priority order,
wherein in the detecting as the recommendation target, the plurality of learning topics including a concept of the formula detected from the learning topic detection request are detected as the recommendation target;
wherein the setting of the priority order comprises setting the concept distance between the learning topic detected as the recommendation target and the learning topic corresponding to the learner's recent learning history, based on the tree map stored in the tree map database; and
wherein in the setting of the priority order, the priority order to the plurality of learning topics are set based on the concept distance between the learning topic corresponding to the learner's recent learning history and the learning topic detected as the recommendation target.

8. The learning recommendation method of claim 7, wherein in the detecting as the recommendation target, a plurality of learning topics including a concept of the formula are detected as the recommendation target from among learning topics included in a learning curriculum.

9. The learning recommendation method of claim 7, further comprising:
sensing a learner input generated in a region of the learning recommendation screen output by the display, in which the learning topics as the recommendation target are displayed, and transmitting an input sensing message including the learner input;
transmitting, based on the input sensing message, a learning information detection request including a learning code of one of the plurality of learning topics displayed on the learning recommendation screen;
detecting, based on the learning information detection request, learning information associated with the learning code included in the learning information detection request, and transmitting a learning detection completion message including the learning information;
transmitting, based on the learning detection completion message, a learning information output request including the learning information; and
outputting the learning information by the display receiving the learning information output request.

10. The learning recommendation method of claim 7, wherein in the outputting of the learning recommendation screen, the formula image is output to a first region of the learning recommendation screen, the formula is outputted to a second region of the learning recommendation screen, and the plurality of learning topics detected as the recommendation target are outputted to a third region of the learning recommendation screen.

11. The learning recommendation method of claim 7, wherein in the setting of the priority order, the priority order of the plurality of learning topics set as the recommendation target is set based on a tree map in which a same concept distance is set for a plurality of learning topics included in the learning curriculum, so that the concept distance of two adjacent learning topics is set equal to the concept distance of two other adjacent learning topics.

12. The learning recommendation method of claim 7, wherein in the setting of the priority order, the priority order of the plurality of learning topics set as the recommendation target is set based on a tree map in which different concept distances are set for a plurality of learning topics included in the learning curriculum, so that the concept distance of two adjacent learning topics is set different from the concept distance of two other adjacent learning topics.

13. The learning recommendation method of claim 7, wherein in the setting of the priority order, the priority order of the plurality of learning topics set as the recommendation target is set based on a tree map in which concept distances set to a plurality of learning topics included in a learning curriculum are different for each learner.

* * * * *